No. 754,370. Patented March 8, 1904.

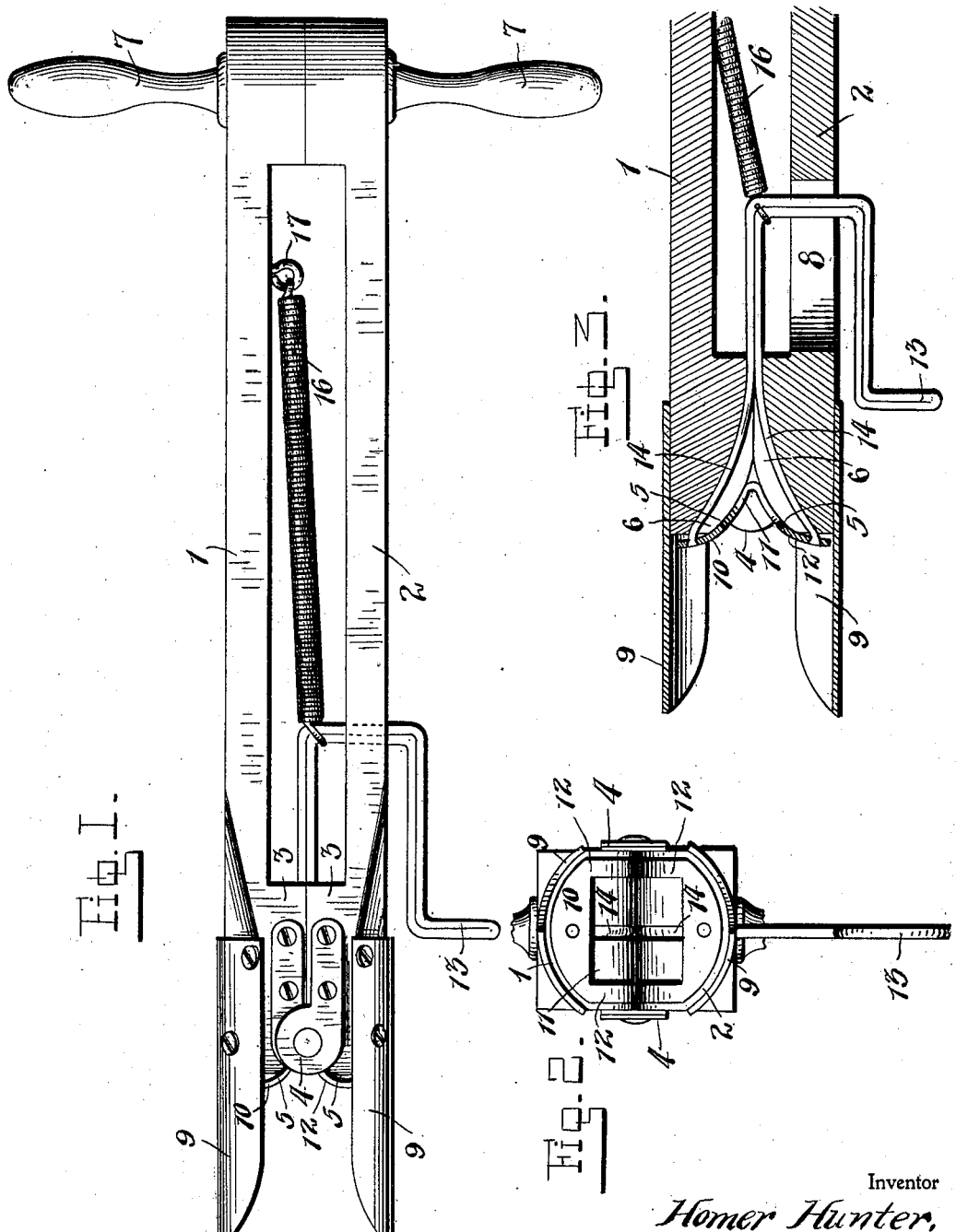

UNITED STATES PATENT OFFICE.

HOMER HUNTER, OF FORT COLLINS, COLORADO, ASSIGNOR OF ONE-HALF TO ARTHUR C. BARTELS, OF DENVER, COLORADO.

BEET-TRANSPLANTER.

SPECIFICATION forming part of Letters Patent No. 754,370, dated March 8, 1904.

Application filed July 9, 1903. Serial No. 164,915. (No model.)

*To all whom it may concern:*

Be it known that I, HOMER HUNTER, a citizen of the United States, residing at Fort Collins, in the county of Larimer and State of Colorado, have invented certain new and useful Improvements in Beet-Transplanters; and I do declare the following to be a full, clear, and exact description of the invention, such as will enable others skilled in the art to which it appertains to make and use the same.

My invention is an improved transplanter especially adapted for use in transplanting sugar-beets; and it consists in the peculiar construction and combination of devices hereinafter described and claimed.

The object of my invention is to provide an improved implement of this character which is adapted for use in taking up young beets together with the earth which immediately surrounds them and for transplanting such beets and also for preparing the holes in which the beets are to be set.

In the accompanying drawings, Figure 1 is an elevation, partly in section, of a beet-transplanting implement embodying my improvements. Fig. 2 is a bottom plan view of the same. Fig. 3 is a central sectional view of the lower portion of the same.

The arms 1 2 have their lower ends provided with inset shoulders 3 and are pivotally connected together at their lower ends by hinges 4 or other suitable devices. The inset shoulders 3 have their lower portions flared outwardly from their inner sides, as at 5, and they are provided in their opposing sides at their centers with grooves 6, which widen as they extend downwardly, as shown in Fig. 3. The upper ends of the arms 1 2 are provided with oppositely-extending handles 7. The arm 2 is provided for a suitable distance above its inset shoulder 3 with a slot 8.

Shovels or blades 9, which are preferably trowel shape and concavo-convex in cross-section with their convex sides outermost, have their upper portions secured to the outer sides of the arms 1 2 at the lower ends thereof, where the said arms are appropriately rounded to fit in the concave upper portions of the said blades or shovels. The latter extend below the arms 1 2 for a suitable distance.

A piston or tamper 10 is disposed to operate between the blades or shovels 9. The same has a central opening 11 of suitable size and shape, and its portions 12, which form opposite sides of the said opening, are bent, as shown in Fig. 3, and are adapted to enter the space between the flared portions 5 of the inset shoulders 3. A foot-piece 13 is connected to the piston or tamper by means of rods 14, which are bent, as shown in Fig. 3, to operate in the grooves 6 and to extend through and operate in the slot 8. As here shown, the foot-piece and rods are formed integral; but the same may be otherwise constructed. I do not limit myself in this particular. A spring 16, which is here shown as a coil retractile spring, is connected to said rods and is also attached to the arm 1, as at 17. The function of this spring, as will be understood, is to draw the piston or tamper upwardly and normally hold the same in engagement with the lower ends of the arms 1 2.

In the operation of my invention the upper ends of the arms 1 2 are first closed together and shovels 9 are inserted in the ground at the place where it is desired to set a beet or other plant. The arms 1 2 are then opened to some extent to cause the blades 9 to clamp the earth between them, and the same being then withdrawn from the ground an opening is made, as will be understood, by the removal of the earth. The arms 1 2 are then closed and the tamper operated by one foot to eject the core of earth from between the blades 9. The latter are then forced into the ground on opposite sides of the beet or other plant to be transplanted, the arms 1 2 opened, as before, to cause the said blades to be compressed on opposite sides of the earth immediately surrounding the plant, and the implement being then raised the plant, together with the soil immediately attached thereto, is lifted and can then be readily placed in the opening or hole in the earth prepared to receive it. By pressing lightly with one foot on the foot-piece the piston or tamper may be then caused to "firm"

the plant in the ground and clear the same from the blades 9.

Having thus fully described my invention, what I claim as new, and desire to secure by Letters Patent, is—

1. A transplanter, comprising pivotally-connected arms having blades at their lower ends, one of said arms having a slot, a tamper disposed to operate between said blades, a foot-piece to operate the tamper and having a connection therewith extending through and operating in the slot, and a spring to normally raise the tamper.

2. A transplanter, comprising pivotally-connected arms having blades at their lower ends, one of said arms having a slot, a tamper disposed to operate between said blades, a foot-piece to operate the tamper and having a connection therewith extending through and operating in the slot, and a spring attached to said connection and one of said arms, and normally raising the tamper, substantially as described.

In testimony whereof I have hereunto set my hand in presence of two subscribing witnesses.

HOMER HUNTER.

Witnesses:
  W. H. MULLIN,
  CHAS. THARP.